United States Patent
Esty et al.

(10) Patent No.: US 6,983,036 B2
(45) Date of Patent: Jan. 3, 2006

(54) METHOD OF RATING TECHNICIANS FOR A TELECOMMUNICATIONS COMPANY

(76) Inventors: Michael Wayne Esty, 3011 River Forest Dr., Richmond, TX (US) 77469; Douglas Thomas Michel, 3043 Pecan Point Dr., Sugarland, TX (US) 77478

( * ) Notice: Subject to any disclaimer, the term of this patent is extended or adjusted under 35 U.S.C. 154(b) by 0 days.

(21) Appl. No.: 10/933,769

(22) Filed: Sep. 3, 2004

(65) Prior Publication Data

US 2005/0053210 A1    Mar. 10, 2005

Related U.S. Application Data

(60) Provisional application No. 60/500,169, filed on Sep. 4, 2003.

(51) Int. Cl.
*H04M 1/24*  (2006.01)
*H04M 15/00* (2006.01)
(52) U.S. Cl. ........................ 379/9.04; 379/111
(58) Field of Classification Search .............. 379/21, 379/9.01, 9.02, 9.03, 1.01, 9.04, 13, 111, 379/112.01, 110.01
See application file for complete search history.

(56) References Cited

U.S. PATENT DOCUMENTS 6,771,739 B1 * 8/2004 Beamon et al. ............ 379/9.03
2002/0029161 A1 * 3/2002 Brodersen et al. ............ 705/9

\* cited by examiner

*Primary Examiner*—Rexford Barnie

(74) *Attorney, Agent, or Firm*—Buskop Law Group, P.C.; Wendy Buskop

(57) ABSTRACT

Methods for rating installation technicians for telecommunications are described herein. The method generally includes defining performance criteria, making reports on each technician on a regular basis, assigning a rank to each technician on the regular basis, assigning between zero and five stars to each technician within the rank on a regular basis, creating reports on the technicians, comparing reports to the criteria and comparing the prior rank to the results of the reports.

7 Claims, No Drawings

METHOD OF RATING TECHNICIANS FOR A TELECOMMUNICATIONS COMPANY

BACKGROUND

The present application claims priority to co-pending U.S. Provisional Patent Application Ser. No 60/500,169 filed on Sep. 4, 2003.

Managing companies which install cable television, satellite communication distribution, and telephone and internet service has traditionally been haphazardly run.

FIELD

The present embodiments relate to methods for assigning, tracking and managing tasks for installation technicians for telecommunications contracting companies, such as DSL broad band companies, telephone service providers, cable television providers and satellite television providers.

A need has long existed for a system for managing these types of companies and more importantly for evaluating, assessing, tracking and following up on the labor based tasks of the technicians used in the field.

Most of the existing telecom companies have no documented system of managing and controlling the technicians. Consumers frequently complain about technicians that do not show up on-time to perform the installation, and about the lack of quality control regarding the technicians' actions.

The present invention was designed to overcome these problems and provide a fair, easily implemented, and quick method for assessing technicians, assigning tasks, establishing routes and following up.

The present embodiments meet these needs.

DETAILED DESCRIPTION OF THE PREFERRED EMBODIMENTS

Before explaining the present embodiments in detail, it is to be understood that the embodiments are not limited to the particular embodiments and that it can be practiced or carried out in various ways.

The present embodiments relate to methods for rating installation technicians for telecommunications comprising: a first step of defining performance criteria, then making reports on each technician on a regular basis, assigning a rank to each technician on the regular basis, assigning between zero and five stars to each technician within the rank on a regular basis, creating reports on the technicians, comparing reports to the criteria, and comparing the prior rank to the results of the reports.

The methods can involve the step of assigning rank on a regular basis is once a week.

In still another embodiment, the method contemplates that the performance criteria includes: attainment criteria, maintenance criteria, and star criteria. Attainment criteria relates to a level of training, completion of certain checklists, experience, and prior ranking. Maintenance criteria relates to a level of performance to keep the rank which has been assigned.

In another embodiment, a star is determined using one or more of the following: a defined amount of money produced per week, an average percent of completed tasks within a defined period of time, passing of quality control inspections within a defined period of time, completing a set of tasks related to a defined group of billing codes, maintaining a minimum account balance, completing a defined number of work orders, picking up additional calls, completing a tool check list and attaining a defined profitability value.

The performance criteria can be equated to technician ranks. Technician ranks are general descriptions that designate a technician's overall ability to perform all types of cable, data, and telephony services. Technician ranks are published each week with the Weekly Field Analysis package. Examples of technician ranks include cable puppy, cable dog, cable hound, or cable wolf.

Each rank has criteria that a technician must meet in order to attain that rank. In addition, each rank has maintenance criteria that a technician must sustain in order to keep that rank. For each rank a technician may earn up to five stars. Each star also has criteria, appropriate for that rank.

On a periodic basis, such as weekly, a list can be published with the technician's rank and number of stars they have earned. Stars are not cumulative. They are to be re-earned each week. For example, an technician may be designated a three-star cable dog one week and a one-star cable dog the following week. If the technician does not meet the maintenance criteria for the rank they hold, they are demoted to the next rank, provided they meet that rank's attainment criteria, otherwise they may be demoted even further. For example, a technician may be a cable hound one week and demoted to a cable dog the following week.

Some stars are tied to specific accomplishments. Once these tasks are accomplished, the star at the respective technician ranking would not be revoked unless specifically submitted by the Field leader for noticeable non-compliance.

Since technicians are expected to start from the bottom and work their way up, the criteria for attaining rank and stars are building blocks to the next higher rank.

For example, the rankings, their description, attainment and maintenance criteria and the star criteria can be presented in ascending order as follows:

Cable Puppy—These are technicians who have just completed training and are new to the business.
 a. Attainment Criteria—Complete Training; Sign Contract; Load;
 b. Maintenance Criteria—None (this is the lowest rank);
 c. Star Criteria—Complete Tool Checklist for Cable Puppy (verified by company representative); Production of $500 for one week; 60 percent In-Time Completion for the week; Quality Control Inspection passed for the week; No missed commitments for the week, etc.

Cable Dog—This is the rank the majority of technicians will have. These are the seasoned technicians.
 a. Attainment Criteria—All Cable Puppy Star Criteria; Complete Tool Checklist for Cable Dog; Four weeks as technician; Average 70 percent in-time completion for the previous four weeks;
 b. Maintenance Criteria—Average 70 percent in-time completion for the previous four weeks;
 c. Star Criteria—Minimum Positive Account Balance; Production of $600 per week for previous four weeks; Customer Service Subjective Evaluation pass/fail (every four weeks, including no call no show (NCNS), appearance, operations input); Quality Control passed the previous four weeks; No missed commitments the previous four weeks, etc.

Cable Hound—Technicians who attain this rank are in the upper tier of technicians and demonstrate a level of performance that shows they are not only an outstanding technician, but are a team player. They capable of handling many of the tougher jobs.

a. Attainment Criteria—All Cable Dog Star Criteria; Average 80 percent in-time completion for the previous four weeks; Skill set billing codes for the previous four weeks (2 wall drops, 8 wire jobs);
b. Maintenance Criteria—Average 80 percent in-time completion for the previous four weeks;
c. Star Criteria—Top 30 percent in profitability for the previous four weeks; Production of $800 per week for previous four weeks; Average 2 pick-up calls per week for the previous 4 weeks; Skill set billing codes for the previous 4 weeks (6 wall drops, 16 wire jobs); No Missed Commitments for the previous four weeks; Quality Control passed for the previous four weeks; Customer Service Subjective Evaluation pass/fail (every four weeks); etc.

Cable Wolf—Technicians who are designated cable wolves are the very best among their peers. They are the ones who get and handle the toughest of jobs and provide stellar customer service. They are team players that other technicians look to for help and guidance. Field Operation's has the goal of building a wolf pack that will provide a solid core for the field.

a. Attainment Criteria—All Cable Hound Star Criteria; Average 90 percent in-time completion for the previous four weeks;
b. Maintenance Criteria—Average 90 percent in-time completion for the previous four weeks; Skill set billing codes for the previous four weeks (2 wall drops, 8 wire jobs);
c. Star Criteria—Top 10 percent in profitability for the previous four weeks; Production of $1000 per week for the previous four weeks; Average 3 pick-up calls per week for the previous four weeks; Skill set billing codes for the previous four weeks (6 wall drops, 16 wire jobs); No Missed Commitments for the previous four weeks; Quality Control passed for the previous four weeks; Customer Service Subjective Evaluation pass/fail (every four weeks), etc.

Many star criteria take into account the previous four weeks of performance. When the previous four weeks do not have data for the criteria to be computed, only those weeks where data is available will be used to calculate whether star criteria is met. For example, when an technician is off for two weeks, those weeks in which production was not run are not included in determining whether the criteria is met nor is the period extended to include previous weeks outside the period (i.e. the two weeks prior to the beginning of the four week period (last 6 weeks) would not be included in the criteria period).

Star criteria is evaluated every four weeks and remains in effect until the next evaluation period. Therefore, a technician who earns the star in the evaluation period will keep the star until the next time that star criteria is evaluated. Likewise, the technician who does not earn the star in the evaluation period will have to wait until the next evaluation period before being eligible to attain that star.

The criteria in the examples described above can be changed to meet specific client needs.

While these embodiments have been described with emphasis on the preferred embodiments, it should be understood that within the scope of the appended claims, the embodiments might be practiced other than as specifically described herein.

What is claimed is:

1. A method for rating installation technicians for telecommunications comprising:
   a. defining performance criteria;
   b. making reports on each technician on a regular basis;
   c. assigning a rank to each technician on the regular basis;
   d. assigning between zero and five stars to each technician within the rank on a regular basis;
   e. creating reports on the technicians;
   f. comparing reports to the criteria; and
   g. comparing the prior rank to the results of the reports.

2. The method of claim 1, wherein the regular basis is once a week.

3. The method of claim 1, wherein the performance criteria is selected from a group consisting of attainment criteria, maintenance criteria, and star criteria.

4. The method of claim 3, wherein the attainment criteria relates to a level of training, completion of certain checklists, experience, and prior ranking.

5. The method of claim 3, wherein the maintenance criteria relates to a level of performance to maintain an assigned rank.

6. The method of claim 1, wherein the star criteria star is determined using one or more of the following:
   a. a defined amount of money produced per week;
   b. an average percent of completed tasks within a defined period of time;
   c. passing of quality control inspections within a defined period of time;
   d. completing a set of tasks related to a defined group of billing codes;
   e. maintaining a minimum account balance;
   f. completing a defined number of work orders;
   g. picking up additional calls;
   h. completing a tool check list; and
   i. attaining a defined profitability value.

7. The method of claim 1, wherein the ranking is selected from a group consisting of cable puppy, cable dog, cable hound, and cable wolf.

* * * * *